(12) United States Patent
Gocke et al.

(10) Patent No.: US 10,434,932 B2
(45) Date of Patent: Oct. 8, 2019

(54) MOTOR VEHICLE

(71) Applicant: Bayerische Motoren Werke Aktiengesellschaft, Munich (DE)

(72) Inventors: Tim Gocke, Munich (DE); Marcel Sieler, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/962,878

(22) Filed: Apr. 25, 2018

(65) Prior Publication Data

US 2018/0236929 A1    Aug. 23, 2018

Related U.S. Application Data

(63) Continuation of application No. PCT/EP2016/074708, filed on Oct. 14, 2016.

(30) Foreign Application Priority Data

Oct. 27, 2015    (DE) .................. 10 2015 220 911

(51) Int. Cl.
   *B60Q 1/24*    (2006.01)
   *B60Q 1/32*    (2006.01)
   (Continued)

(52) U.S. Cl.
   CPC ............ *B60Q 1/24* (2013.01); *B60Q 1/323* (2013.01); *F21S 41/143* (2018.01); *F21S 41/265* (2018.01); *B60Q 2400/40* (2013.01)

(58) Field of Classification Search
   CPC .. B60Q 2400/40; B60Q 2400/50; B60Q 1/32; B60Q 1/323
   See application file for complete search history.

(56) References Cited

U.S. PATENT DOCUMENTS 7,878,693 B2 *   2/2011   Liesener ............. B60Q 1/2665
                                                          362/494
9,247,222 B2     1/2016   Sieler et al.
(Continued)

FOREIGN PATENT DOCUMENTS

DE    10 2006 036 061 A1    2/2008
DE    10 2009 024 894 A1    12/2010
(Continued)

OTHER PUBLICATIONS

PCT/EP2016/074708, International Search Report dated Dec. 9, 2016 (Three (3) pages).
(Continued)

*Primary Examiner* — Alexander K Garlen
(74) *Attorney, Agent, or Firm* — Crowell & Moring LLP (57) ABSTRACT

The invention relates to a motor vehicle comprising a device for illuminating the surroundings for generating a light distribution on the ground in an area surrounding the motor vehicle. The device includes a projection module, which comprises a light-emitting means having a number of light sources and an array of projection optical units, wherein a respective projection optical unit comprises an object structure and an associated projection lens, such that, upon illumination of the array with the light-emitting means, the object structures are projected onto the ground by the associated projection lenses and the light distribution is thus generated. The array of projection optical units comprises a plurality of subarrays, which are illuminable separately with at least one light source of the light-emitting means that is associated with the respective subarray. The array has at least two different types of subarrays which, upon illumination with the at least one associated light source, generate different projections on the ground.

20 Claims, 7 Drawing Sheets

(51) Int. Cl.
*F21S 41/143* (2018.01)
*F21S 41/265* (2018.01)

(56) References Cited

U.S. PATENT DOCUMENTS

| | | | | |
|---|---|---|---|---|
| 2002/0041498 | A1* | 4/2002 | Furst | B60Q 1/2665 362/494 |
| 2007/0053195 | A1 | 3/2007 | Alberti | |
| 2010/0321945 | A1* | 12/2010 | Lang | B60Q 1/2669 362/501 |
| 2014/0146290 | A1* | 5/2014 | Sieler | G03B 21/001 353/30 |
| 2014/0320823 | A1* | 10/2014 | Ammar | B60R 1/12 353/13 |
| 2017/0210282 | A1* | 7/2017 | Rodriguez Barros | G03B 21/00 |

FOREIGN PATENT DOCUMENTS

| | | |
|---|---|---|
| DE | 20 2011 000 429 U1 | 5/2011 |
| DE | 10 2011 076 083 A1 | 11/2012 |
| DE | 10 2013 211 877 A1 | 1/2015 |
| EP | 2 674 328 A2 | 12/2013 |

OTHER PUBLICATIONS

German Search Report issued in German counterpart application No. 10 2015 220 911.3 dated Jul. 19, 2016, (Six (6) pages).

* cited by examiner

MOTOR VEHICLE

CROSS REFERENCE TO RELATED APPLICATIONS

This application is a continuation of PCT International Application No. PCT/EP2016/074708, filed Oct. 14, 2016, which claims priority under 35 U.S.C. § 119 from German Patent Application No. 10 2015 220 911.3, filed Oct. 27, 2015, the entire disclosures of which are herein expressly incorporated by reference.

BACKGROUND AND SUMMARY OF THE INVENTION

The invention relates to a motor vehicle having an environment illumination device for producing a light distribution on the ground in the area surrounding the motor vehicle.

It is known to integrate in the external door handle of a vehicle an environment illumination device which is activated upon unlocking of the vehicle. Also available is exit illumination, which is installed in the lower edge of the door paneling of a motor vehicle. Environment illumination in the external door handle and exit illumination have the disadvantage that they are visible only if the door is closed or opened, respectively.

Document DE 10 2013 211 877 A1 discloses an environment illumination device using a projection module made of an array of projection optical units. Light patterns, such as e.g. stripe patterns, are projected onto the ground in the environment of the motor vehicle. The projection module is suitable only for generating a single predetermined light distribution.

It is an object of the invention to provide a motor vehicle having an environment illumination device that can easily and efficiently generate a plurality of different light distributions on the ground in the area surrounding the motor vehicle.

The motor vehicle according to the invention, which is in particular a passenger car, comprises an environment illumination device for generating a light distribution on the ground in the area surrounding the motor vehicle, wherein the environment illumination device has a projection module and optionally a plurality of projection modules. A respective projection module comprises a light-emitting means having a number of light sources and an array of projection optical units, wherein a respective projection optical unit comprises an object structure and an associated projection lens, such that, upon illumination of the array with the light-emitting means, the object structures are projected onto the ground in the environment of the motor vehicle by the associated projection lenses and the light distribution is thus generated. Light sources used in the projection module are preferably one or more LEDs and optionally also one or more laser diodes.

With preference, a projection module is used in the motor vehicle according to the invention that is based on the technology of projection display, which is described in document DE 10 2009 024 894 A1 and in document DE 10 2011 076 083 A1. Unlike the projection display disclosed in said documents, the array of projection optical units is divided into a plurality of subarrays for generating different light distributions, as will be explained in detail below. The entire disclosure content of the above-mentioned two documents is incorporated in this application by way of reference.

In accordance with the invention, the array of projection optical units comprises a plurality of subarrays, which are illuminable separately with at least one light source of the light-emitting means that is associated with the respective subarray (preferably a single light source). The array has at least two different types of subarrays which, upon illumination with the at least one associated light source, generate different projections on the ground in the environment of the motor vehicle. In other words, each type of subarray produces a projection different from the remaining types of subarrays upon corresponding illumination with the associated light sources.

Provided in the array of projection optical units are a first number of subarrays (e.g. a single subarray) and a second number of subarrays (e.g. a single subarray). These are controllable such that, when the environment illumination device is switched on, only the first number of subarrays can be activated by switching on the associated light source or light sources of the subarrays of the first number or only the second number of subarrays can be activated by switching on the associated light source or light sources of the subarrays of the second number.

In accordance with the invention, the first number of subarrays is configured such that, upon their activation, a light pattern is produced on the ground in the environment of the motor vehicle, whereas the second number of subarrays is configured such that, upon their activation, a homogeneous light distribution is produced on the ground in the environment of the motor vehicle. Here and below, light pattern is understood to mean a light distribution that varies in terms of brightness and in particular a light/dark distribution, whereas a homogeneous light distribution represents a continuously lit surface area with a substantially constant brightness.

The invention has the advantage that by using different subarrays with corresponding actuation, both a light pattern and a homogeneous light distribution can be generated. The homogeneous light distribution offers very good lighting of the ground in the environment of the motor vehicle, with the result that any additional optical environment illumination integrated for example in the door handle of the motor vehicle can be dispensed with. On account of the projection module that is installed in the vehicle, both the representation of precise graphics in the environment of the vehicle and the reproduction of a uniform light distribution are ensured.

Depending on the configuration of the projection module, a varying number of projection optical units can be provided in the array, e.g. between 100 and 200 projection optical units. The size of the individual projection lenses can also be selected such that it varies. A respective projection lens preferably has a diameter of 2000 µm or less.

In a particularly preferred embodiment, a respective projection module is such that each projection optical unit of a corresponding subarray projects onto the ground an individual image that substantially covers the entire light distribution generated with the subarray, wherein the light distribution is a mutual overlaying of the individual images of the projection optical units of the corresponding subarray.

In a further preferred embodiment, white light is used to generate the light pattern or the homogeneous light distribution. The light-emitting means or the light sources thus produce white light.

In a further expedient configuration, one or more screens are provided in the projection module, which are arranged such that the light of the at least one associated light source of a respective subarray strikes only the respective subarray.

As a result, a separation of the light sources from one another is achieved in a simple manner.

In a further variant, the object structures of the projection optical units within a respective subarray are identical, while the object structures of the projection optical units of the different types of subarray differ from one another.

In a particularly preferred embodiment, the first number of subarrays consists of one or more identical subarrays of a first type which produce the light pattern upon illumination with the associated light source or light sources. By contrast, the second number of subarrays consists of one or more identical subarrays of a second type, different from the first type, wherein the subarrays of this second number of subarrays generate the homogeneous light distribution upon illumination with the associated light source or light sources. As a result, different light distributions can be produced in a particularly simple manner. The first number and the second number of subarrays are here in each case responsible separately for the generation of the light pattern and the homogeneous light distribution.

In a further configuration of the invention, the first number of subarrays consists of one or more identical subarrays of a first type which produce the light pattern upon illumination with the associated light source or light sources. Unlike in the previously described embodiment, the second number of subarrays here consists of the first number of subarrays and in complementary fashion of one or more identical subarrays of a second type, with the second type in turn differing from the first type. Upon illumination with the associated light source or light sources, the subarray or subarrays of the second type produce(s) a light pattern that is complementary to the light pattern which is produced by the subarray or subarrays of the first type. Complementary means that the bright regions of the corresponding light pattern are dark in the complementary light pattern and that the dark regions of the corresponding light pattern are bright in the complementary light pattern. In other words, when all subarrays of the second number of subarrays are illuminated, the light patterns complement one another such that the homogeneous light distribution is thus generated.

In a further modification of the invention, the generated light pattern and/or the homogeneous light distribution is/are overlaid by one or more symbols. In this way, graphic effects can be generated in the light distributions.

In a further configuration, the light pattern and the homogeneous light distribution substantially cover the same surface area on the ground.

Optionally, a plurality of different patterns can also be generated with the environment illumination device of the motor vehicle according to the invention. In this case, a plurality of first numbers of subarrays are provided, which are controllable such that, when the environment illumination device is switched on, only a first number of subarrays can be activated by switching on the associated light source or light sources.

In a further preferred embodiment, the projection module is arranged in a light shaft that extends into the body of the motor vehicle, as a result of which direct glare by the light-emitting means of the projection module is avoided.

In a further configuration, the installation position of the projection module in the motor vehicle can be adjusted, i.e. a corresponding adjustment means is provided. This adjustment means can facilitate, depending on the use, manual and/or automatic adjustment of the installation position. In this way, manufacturing tolerances can be taken into consideration in the integration of the projection module in the vehicle, and the corresponding light distribution can always be imaged sharply due to the adjustment of the installation position of the projection module.

The light pattern generated within the scope of the invention can have different configurations. In one variant, the light pattern is a stripe pattern, wherein the density of the stripes in a predetermined direction on the ground preferably reduces with increasing distance of the stripe pattern from the installation position of the projection module in the motor vehicle. In this way, attractive effects can be generated with the light pattern.

In a further configuration, the light pattern comprises a pattern of dots and/or of graphic elements, such as logos. The density of the dots and/or graphic elements preferably decreases in a predetermined direction on the ground with increasing distance of the pattern from the installation position of the projection module or modules in the motor vehicle. By contrast, the diameter of the dots and/or graphic elements preferably increases in a predetermined direction on the ground with increasing distance of the pattern from the installation position of the projection module.

In a particularly preferred embodiment, the dots of the dot pattern adjacent to the installation position of the projection module can initially have a diameter of 3 mm, with this diameter then continuously increasing to 40 mm. The dot distance can likewise be only in the range of approximately 4 to 5 mm initially, and then continuously increase to 40 mm with increasing distance from the installation position.

In a further configuration, the light pattern at an end remote from the installation position of the projection module in the motor vehicle is blurred and/or decreases in terms of brightness.

In a further preferred variant, the light pattern and/or the homogeneous light distribution expand(s) along a predetermined direction on the ground with increasing distance of the light pattern and/or of the homogeneous light distribution from the installation position of the projection module in the motor vehicle.

Switching on of the environment illumination device in the vehicle according to the invention can be coupled to different events. In particular, switching on can be coupled to unlocking a central locking system and/or opening of an access door of the motor vehicle. The activation of the first and/or second number of subarrays can furthermore be effected by way of dimming up the associated light source or light sources of the subarrays of the corresponding number.

In a further preferred configuration of the invention, rain and/or darkness is detected using a sensor of the motor vehicle, wherein, in the case of rain and/or darkness, only the homogeneous light distribution is generated by activating the second number of subarrays upon switching on of the environment illumination device.

The realization that the environment of the motor vehicle should be lit as uniformly as possible in the case of darkness or rain is used here to facilitate the entry and/or exit by people and in particular to prevent them from stepping into puddles. By contrast, if neither rain nor darkness is detected, it is optionally always possible for the light pattern to be produced by the projection module rather than the homogeneous light distribution.

In a further preferred configuration of the invention, the environment illumination device is configurable, via a user interface in the motor vehicle, as to whether the homogeneous light distribution or the light pattern should be produced when switching on the environment illumination device. If a plurality of different light patterns is producible by the projection module, then it may also be possible to determine via the user interface which of the light patterns should be generated. In a further preferred variant, it is also possible to determine via the user interface under which conditions or based on which events the homogeneous light distribution or the light pattern or one of the light patterns should be produced.

In a preferred variant, the projection module of the environment illumination device is mounted in the region of an access door of the motor vehicle such that the light pattern and/or the homogeneous light distribution is/are produced in the opening region of the access door, with the light pattern and/or the homogeneous light distribution preferably not being changed or obscured by the access door being opened. The access door is preferably a person entry door. In this variant of the invention, the safety while people enter and exit the motor vehicle is increased by providing good lighting of the ground before the person enters.

In a further variant, the projection module is provided in a door sill of the motor vehicle, in particular at an installation position that is located, in the longitudinal direction of the motor vehicle from the front to the rear, in front of a person entry door.

In a further, particularly preferred embodiment, the projection module is arranged in the motor vehicle such that the light pattern and/or the homogeneous light distribution extend(s) on one side of the motor vehicle substantially along a driver or passenger entry door and an entry door for backseat passengers that is located behind it. Environment illumination devices having a corresponding projection module are preferably provided on both sides of the motor vehicle.

Alternatively or additionally, it is possible for an environment illumination device to be installed in the motor vehicle whose projection module generates during operation a light pattern and/or a homogeneous light distribution below and/or in the longitudinal direction of the motor vehicle behind a trunk access door. The term trunk access door is to have a broad meaning and can comprise not only the trunk lid of a notchback sedan, but also the tailgate of a hatchback or liftback or fastback vehicle.

In a further variant of the motor vehicle according to the invention, the light pattern and/or the homogeneous light distribution on the ground indicate(s) the detection field of a wireless sensor, wherein the detection field is preferably an actuation field such that, if body parts and/or objects are brought into the actuation field, an actuation action in the motor vehicle is automatically triggered. In one preferred variant, the wireless sensor is configured such that, upon detection of a foot in the detection field, the trunk access door is automatically unlocked and/or opened.

In addition to the above-described motor vehicle, the invention furthermore relates to an environment illumination device for this motor vehicle. The environment illumination device is provided for producing a light distribution on the ground in the environment of the motor vehicle and has a projection module that comprises a light-emitting means having a number of light sources and an array of projection optical units, wherein a respective projection optical unit comprises an object structure and an associated projection lens, with the result that, upon illumination of the array with the light-emitting means, the object structures are projected onto the ground by the associated projection lenses and the light distribution is produced hereby.

In this environment illumination device, the array of projection optical units comprises a plurality of subarrays, which are illuminable separately with at least one light source of the light-emitting means associated with the respective subarray. The array has at least two different types of subarray which generate different projections on the ground upon illumination with the at least one associated light source. Provided is a first number and a second number of subarrays, which are controllable such that, when the environment illumination device is switched on, only the first number of subarrays can be activated by switching on the associated light source or light sources or only the second subarray can be activated by switching on the associated light source or light sources.

The first number of subarrays is configured such that, upon their activation, a light pattern is produced on the ground, whereas the second number of subarrays is configured such that, upon their activation, a homogeneous light distribution is produced on the ground. The environment illumination device according to the invention can comprise one or more of the above-described features of preferred embodiments of the motor vehicle according to the invention, as long as said features relate to the environment illumination device.

Other objects, advantages and novel features of the present invention will become apparent from the following detailed description of one or more preferred embodiments when considered in conjunction with the accompanying drawings.

BRIEF DESCRIPTION OF THE DRAWINGS

Exemplary embodiments of the invention will be described below with reference to the attached figures in detail.

DETAILED DESCRIPTION OF THE DRAWINGS

Described below is an embodiment of a motor vehicle according to the invention having an environment illumination device which is integrated in the door sill of the motor vehicle and serves for the lateral illumination of the region next to the person entry doors of the motor vehicle.

Figure 1:
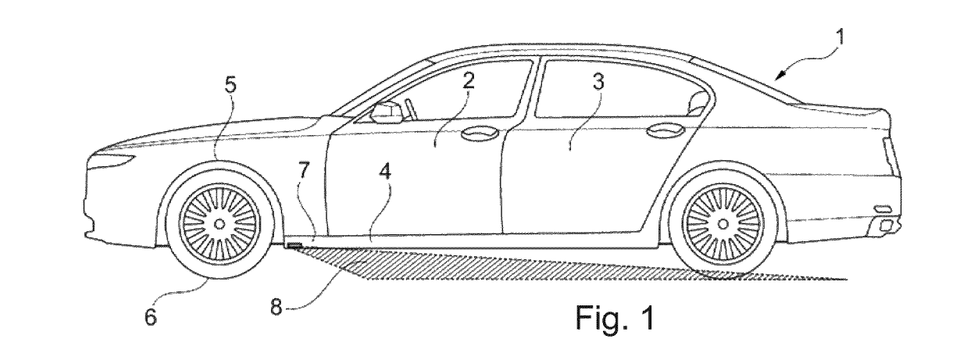
FIG. 1 shows a side view of a motor vehicle according to the invention having an environment illumination device.

FIG. 1 shows a side view of the motor vehicle in the form of the passenger vehicle 1. The passenger vehicle comprises, on the illustrated left-hand side, a driver door 2 and a rear door 3. Analogously provided on the other side of the vehicle (FIG. 2) are a passenger door 2' and a rear door 3', which is located behind the passenger door. In the embodiment of FIG. 1, an environment illumination device having a projection module 7 is provided in the door sill 4 below the doors 2 and 3. Said illumination device is located at the front end of the door sill in the region of the wheel house 5 that surrounds the wheel 6. The projection module of the environment illumination device comprises an array of microlenses which can generate different light distributions in targeted fashion next to the door 2 or next to the door 3 of the motor vehicle.

The projection module 7 uses the technology of projection display, as is described in documents DE 10 2009 024 894 A1 and DE 10 2011 076 083 A1 which have already been mentioned above. That projection display uses a multichannel optical unit having a two-dimensional array of projection optical units comprising microlenses and object structures for projecting an image. In contrast to that projection display, the array of projection optical units in the projection module 7 is divided into two subarrays having different projection optical units. The individual subarrays can be illuminated separately with corresponding LEDs. Upon illumination of one subarray, the light distribution shown in FIG. 2 is produced on the ground next to the motor vehicle in the form of a light pattern LV, whereas, upon illumination of the other subarray, a homogeneous light distribution with a substantially constant light intensity is generated on the ground next to the motor vehicle.

The projection module 7 is highly compact and has dimensions in the centimeter range. In one variant, the width, height and length of the projection module are each approximately 15 mm. Each projection optical unit of a respective subarray of the projection module contains the same object structure and thus produces the same individual image, and the total image is composed of the mutual overlaying of said individual images. The object structures of the individual subarrays differ here, with the result that generating both a light pattern and a homogeneous light distribution is possible. As already mentioned, FIG. 1 and FIG. 2 show the generation of the light pattern LV, which is projected onto the ground next to the doors 2 and 2'. In FIG. 1, the propagation direction of the light from the projection module 7 that is cast onto the ground is designated with the reference sign 8.

Figure 2:
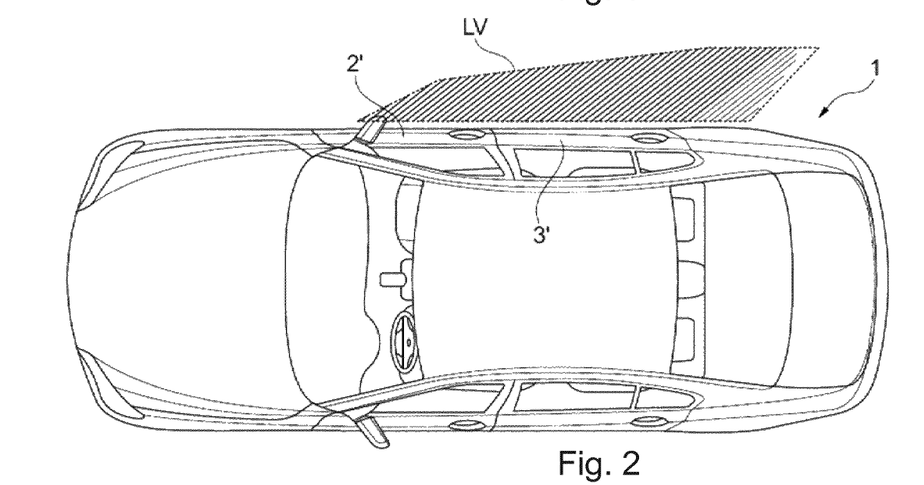
FIG. 2 shows a plan view of the motor vehicle of FIG. 1.

The light pattern LV projected onto the ground next to the vehicle can be seen in the plan view in FIG. 2 and produces the effect of a light carpet. It should be noted here that, unlike in FIG. 1, the light distribution is reproduced to the right of the vehicle 1 next to the doors 2' and 3'. This is possible because projection modules 7 are installed in the motor vehicle symmetrically on the right-hand and left-hand sides. In other words, light distributions are produced both on the left-hand side and on the right-hand side of the vehicle next to the entry doors in a correspondingly mirrored fashion. For reasons of clarity, FIG. 2 reproduces only the light distribution next to the doors 2' and 3'. In the exemplary embodiment of FIG. 2, the light pattern LV represents a pattern of parallel stripes, which run at an angle to the longitudinal axis of the vehicle. The stripes are dark in the illustration and represent in the actual light distribution bright bars on the ground next to the vehicle. As can be seen from FIG. 2, the light distribution expands from the front door 2' to the region behind the door 3'. It can also be seen that the stripe pattern blurs in the rear region, with this effect being generated by way of a decreasing brightness of the stripes.

The illustrated stripe pattern is merely an example of a generated light pattern, and any desired other patterns can be produced. In particular, a dot pattern can possibly also be reproduced by the light distribution. Moreover, the stripes of the stripe pattern can also extend in a different direction, e.g. parallel to the vehicle longitudinal axis or perpendicular thereto. In the embodiment of FIG. 2, the light pattern is a "welcome element," as it is known, in which the light projection is produced on the ground in front of the vehicle as the driver or a passenger approaches the vehicle.

It is also possible for a homogeneous light distribution to be generated with the projection module 7 by way of illuminating the other subarray of the projection optical unit array, the spatial extent of which corresponds to the light distribution LV shown in FIG. 2. Very good lighting of the ground in front of the vehicle doors is achieved with this homogeneous light distribution. Provision of conventional door illumination in the form of LEDs in corresponding door handles in the vehicle can consequently be dispensed with, because the homogeneous light distribution generated with the projection module already sufficiently lights the region in front of the doors of the vehicle. The projection module therefore has the essential advantage that it not only performs the function as a welcome element, but also the function of conventional optical door illumination, with the result that such door illumination no longer needs to be provided separately in the motor vehicle.

The light pattern LV or the corresponding homogeneous light distribution may also be generated e.g. only in the region of the rear door 3 or 3'. In this case, the projection module can be arranged at the front edge of the rear door. Moreover, arranging the projection module in the door sill 4 ensures that the light pattern or the homogeneous light distribution is not obscured as the doors are opened, i.e. the light distribution is always visible on the ground of the vehicle independently of the position of the doors.

Figure 3:
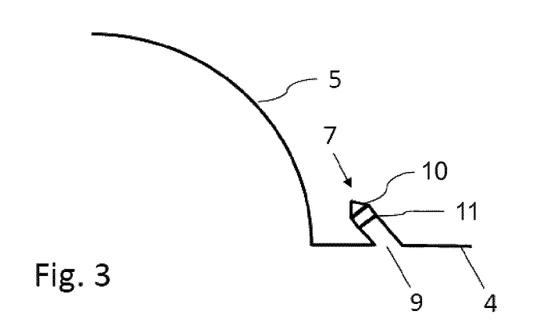
FIG. 3 shows a schematic detail view of the environment illumination device shown in FIG. 1.

FIG. 3 shows a section of a detailed view of the projection module from FIG. 1. The module 7, which is integrated in the door sill 4 adjacent to the wheel house 5, comprises a schematically indicated light-emitting means 10 having two LEDs, as will be described in more detail further below with reference to FIG. 5. The light-emitting means 10 is followed by the multichannel projection optical unit in the form of a microlens array 11. The array in turn is only schematically indicated and will likewise be explained in more detail with reference to FIG. 5. According to FIG. 3, the projection module is arranged in a light shaft 9 that extends at an angle toward the rear, and it is thus ensured that it is not possible to view the light source directly, as a result of which legal requirements are met.

Figure 4:
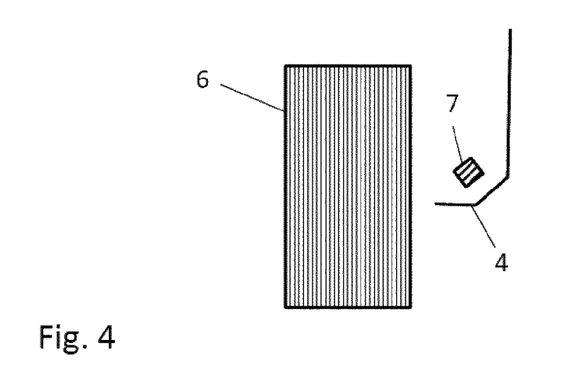
FIG. 4 shows a view of the environment illumination device of FIG. 3 as seen in the longitudinal direction of the motor vehicle.

FIG. 4 shows, once again in section, a view of the projection module from FIG. 3, seen in the longitudinal direction of the vehicle from the front to the rear. FIG. 4 shows, beside the module 7, the front wheel 6 of the vehicle and the door sill 4. The door sill here extends in a partial portion at an angle of approximately 45° with respect to the ground. Located opposite this partial portion is the projection module 7 (merely indicated schematically), wherein for reasons of clarity the light shaft is not reproduced. The projection module 7 is held on the door sill by a holding device, with the light shaft 9 being part of the holding device. The holding device itself is not shown in detail. The holding device can here be removed from the sill such that the projection module can be replaced with a new one in the case of a defect. To compensate for manufacturing tolerances, an adjustment device is preferably provided with which the position of the projection module relative to the light shaft can be set within predetermined limits manually and possibly also automatically via corresponding actuators. It is possible hereby for the light distribution on the ground to always be sharply imaged.

Figure 5:
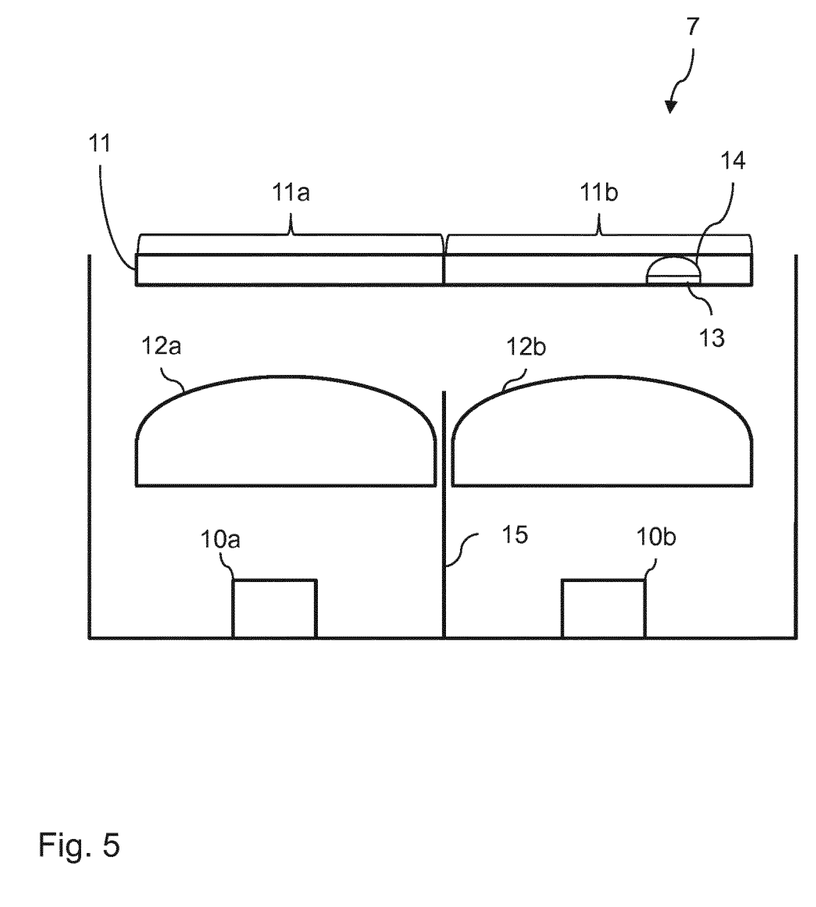
FIG. 5 shows a schematic illustration of a sectional view through the projection module shown in the preceding figures.

FIG. 5 shows a sectional view of the detailed setup of the projection module 7 from the preceding figures. The module comprises as the light-emitting means two LEDs 10a and 10b, which in FIG. 5 emit light toward the top. Provided above these two LEDs 10a and 10b for the purpose of beam guidance are two lenses 12a and 12b. The light from the LEDs exiting the lenses is incident on the array 11 of projection optical units, which in the embodiment of FIG. 5 is divided into two subarrays 11a and 11b. To ensure that the light from the LED 10a strikes substantially only the subarray 11a and the light from the LED 10b strikes substantially only the subarray 11b, a screen 15 is arranged between the two LEDs.

The array 11 composed of projection optical units has a circular configuration as seen in plan view from above and is divided into the two semicircular subarrays 11a and 11b. Each of the subarrays comprises a multiplicity of object structures 13 with associated projection lenses or microlenses 14. For the sake of clarity, FIG. 5 illustrates only one object structure and one projection lens. Approximately 200 such microlenses can be provided in the entire array, for example. The identical object structures are introduced in each of the subarrays 11a and 11b, although the object structures of one subarray differ from the object structures of the other subarray.

Each of the object structures of a subarray is imaged on the ground next to the motor vehicle upon illumination with the corresponding LED and substantially covers the surface area of the entire light distribution to be produced. The light distribution is formed by overlaying all projected object structures on one another. The object structures of the subarray 11a are configured such that the light pattern LV that can be seen in FIG. 2 is formed. In contrast, the object structures of the subarray 11b are configured such that a homogeneous light distribution LV' is formed, as can be seen from FIGS. 8 and 9 which are described further below.

In the embodiment of FIG. 5, only the LED 10a is switched on to produce the light pattern LV, while the LED 10b remains switched off. In contrast, only the LED 10b is switched on to generate the homogeneous light distribution, while the LED 10a remains switched off. Each of the subarrays 11a and 11b is therefore responsible exclusively for generating a specific type of light distribution. Although, in a modified variant of the invention, only the light pattern LV is generated by the subarray 11a, the homogeneous light distribution is formed by both subarrays 11a and 11b with simultaneous switching on of both LEDs 10a and 10b. In this case, the object structures 13 in the subarray 11b are configured such that they are complementary to the object structures of the subarray 11a, i.e. a complementary light pattern is generated in which the bright and dark regions are swapped with respect to the light pattern of the subarray 11a.

Figure 6:
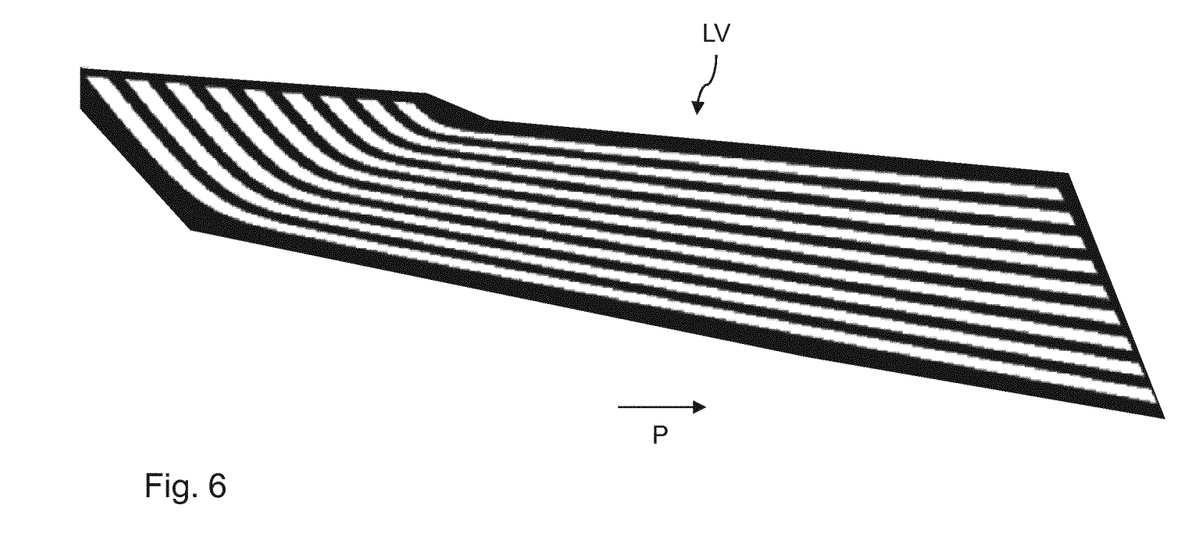
FIG. 6 to FIG. 9 show different variants of light patterns and homogeneous light distributions which can be generated with embodiments of the invention.
Figure 7:
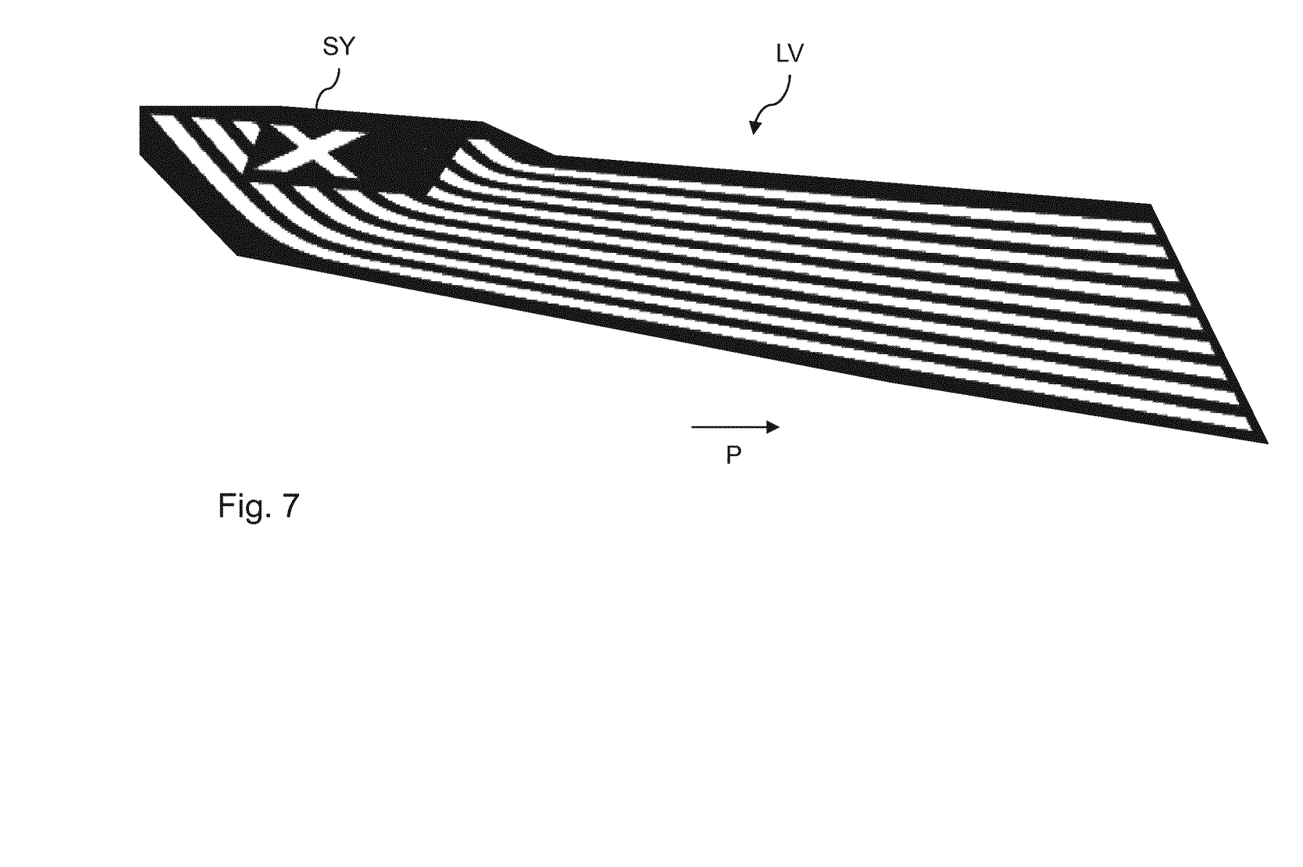
Figure 8:
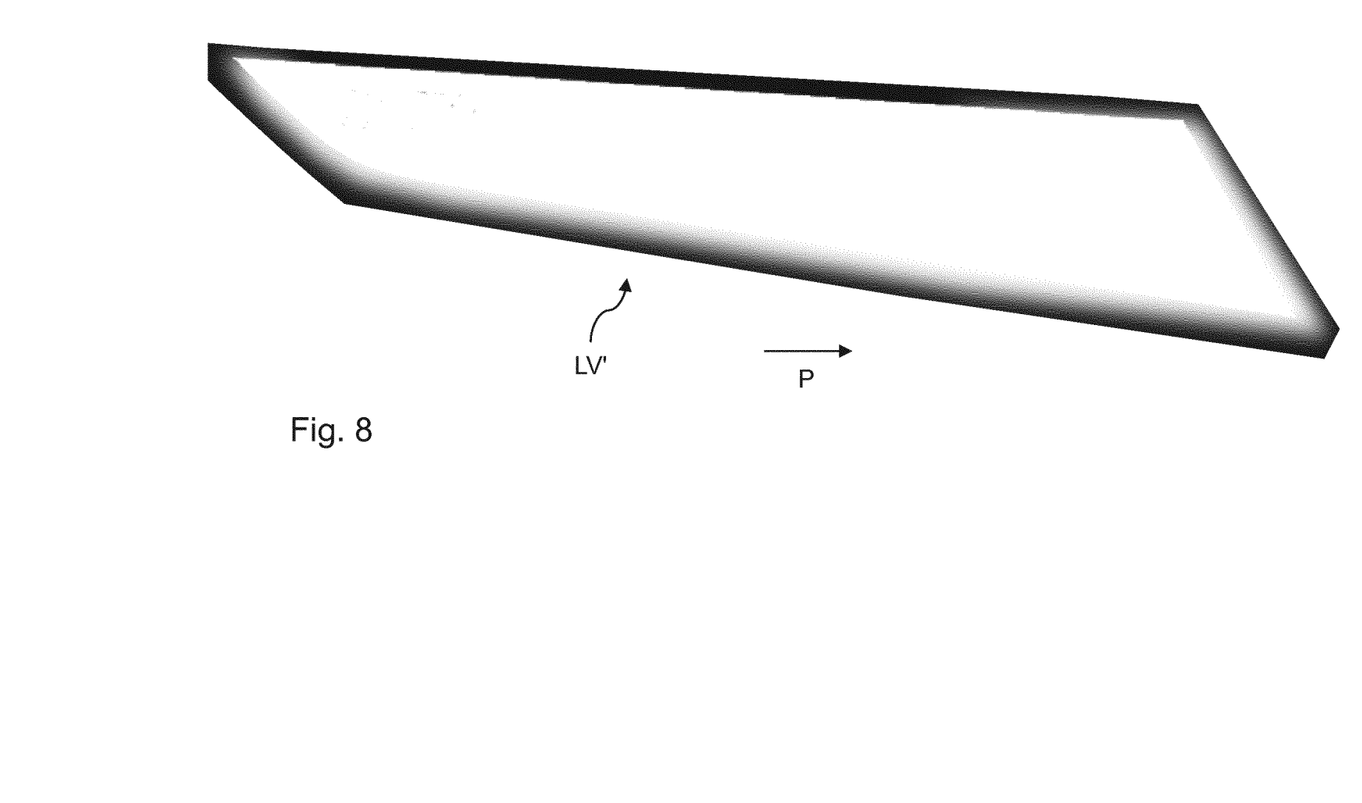
Figure 9:
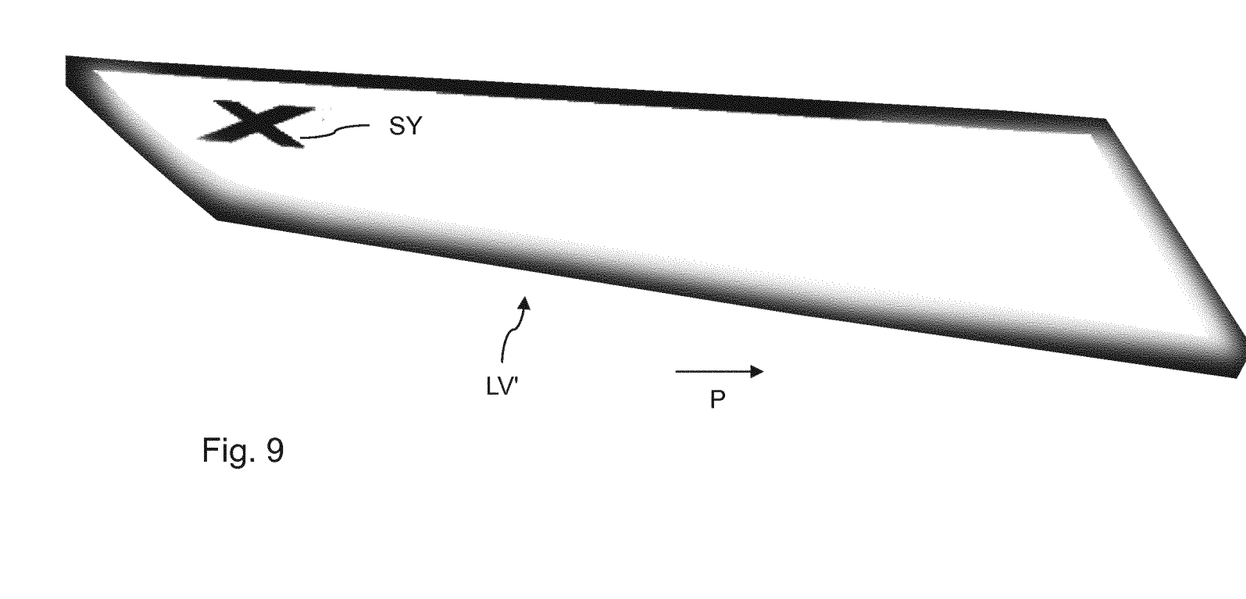

FIG. 6 shows a variant of a light pattern LV that can be produced with the projection module according to the invention. FIG. 6, and also the further FIGS. 7 to 9, show the ground next to the motor vehicle in plan view, with the dark regions being non-illuminated surface areas of the ground. Furthermore, the longitudinal direction of the motor vehicle from the front to the rear is indicated in FIG. 6 to FIG. 9 by way of an arrow P. As opposed to the embodiment of FIG. 1, in FIG. 6, the produced light pattern LV consists of stripes which run continuously from the installation site of the projection module to the rear region of the motor vehicle. FIG. 7 shows a modification of a light pattern LV which can be generated with the projection module. In contrast to FIG. 6, a symbol SY is overlaid on the light pattern, which represents the letter "X."

FIG. 8 shows a variant of a homogeneous light distribution LV', which can be produced with the projection module according to the invention. As can be seen, the light distribution has a continuously bright region with a substantially constant intensity. The surface area of the bright region corresponds substantially to the surface area that is covered by the light pattern LV in FIG. 6. The projection module can generate preferably both the light pattern of FIG. 6 and the homogeneous light distribution of FIG. 8. To produce the homogeneous light distribution LV' from FIG. 8, only the subarray 11b of the projection module from FIG. 5 can be used in one variant. In other words, the object structures in this subarray are configured such that they alone are responsible for producing the homogeneous light distribution. In a modified variant, the object structures of the subarray 11b can also be complementary to the object structures of the subarray 11a. In this case, switching on the two LEDs 10a and 10b produces the homogeneous light distribution LV' by overlaying the two complementary light distributions on one another.

FIG. 9 shows a further modification of a homogeneous light distribution LV' which is generated in the projection module preferably in addition to the light pattern LV in FIG. 7. The homogeneous light distribution LV' is overlaid, analogously to the light pattern of FIG. 7, with a symbol SY in the form of an "X." This type of light distribution can be produced only by separately illuminated object structures in the corresponding subarrays 11a and 11b.

The criteria that determine whether a light pattern LV or a homogeneous light distribution LV' is intended to be generated by the projection module 7 can differ. Since the ground next to the motor vehicle becomes better visible by the homogeneous light distribution, this light distribution is preferably used when it is dark or raining, so that the entering or exiting person has no difficulty seeing the region in front of the vehicle door and any puddles. The generation of the homogeneous light distribution can thus be coupled to detection by corresponding sensors, e.g. a brightness sensor or a rain sensor. There may also be the possibility that a user may determine, via a user interface in the motor vehicle, whether or under which conditions the homogeneous light distribution or the light pattern should be switched on.

The above-described embodiments of the invention exhibit a series of advantages. Since the projection module installed in the motor vehicle can generate both a light pattern and a homogeneous light distribution, it offers the possibility that the projection module also performs the function of a conventional optical apron or door lighting. It is thus possible to dispense with this optical apron lighting, which saves costs. Furthermore, a light distribution which is highly visible is generated by the projection module both in the form of a light pattern and in the form of a homogeneous light field in the area surrounding the motor vehicle. The light distributions are here visible with the vehicle doors both open and closed. Moreover, less installation space is required due to the use of a compact projection module, and, even if the light-emitting means of the projection module becomes soiled or partially covered, the generated light pattern or the homogeneous light distribution remains visible.

LIST OF REFERENCE SIGNS 1 motor vehicle
2, 2', 3, 3' vehicle doors
4 door sill
5 wheel house
6 wheel
7 projection module
8 light propagation
LV light pattern LV' homogeneous light distribution
9 light shaft
10 light-emitting means
10a, 10b LEDs
11 array of projection optical units
11a, 11b subarrays
12a, 12b lenses
13 object structure
14 projection lens
15 screen
P arrow
SY symbol The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
an environment illumination device for producing a light distribution on the ground in an area surrounding the motor vehicle, wherein the environment illumination device has a projection module, which comprises a light-emitting means having a number of light sources and an array of projection optical units, wherein a respective projection optical unit comprises an object structure and an associated projection lens, such that, upon illumination of the array with the light-emitting means, the object structures are projected onto the ground by the associated projection lenses and the light distribution is thus generated,
wherein the array of projection optical units comprises a plurality of subarrays, which are illuminable separately with at least one light source of the light-emitting means that is associated with the respective subarray,
wherein the array has at least two different types of subarrays which, upon illumination with the at least one associated light source, generate different projections on the ground,
wherein a first number of subarrays and a second number of subarrays are provided, which are controllable such that, when the environment illumination device is switched on, only the first number of subarrays can be activated by switching on the associated light source or light sources or only the second number of subarrays can be activated by switching on the associated light source or light sources, and
wherein the first number of subarrays is configured such that, upon their activation, a light pattern is produced on the ground, and the second number of subarrays is configured such that, upon their activation, a homogeneous light distribution is produced on the ground.

2. The motor vehicle as claimed in claim 1, wherein one or more screens are provided in the projection module, which are arranged such that the light of the at least one associated light source of a respective subarray strikes only the respective subarray.

3. The motor vehicle as claimed in claim 1, wherein the object structures of the projection optical units within a respective subarray are identical, while the object structures of the projection optical units of the different types of subarray differ from one another.

4. The motor vehicle as claimed claim 1, wherein the first number of subarrays comprises one or more identical subarrays of a first type which produce the light pattern upon illumination with the associated light source or light sources, and the second number of subarrays comprises one or more identical subarrays of a second type, which produce the homogeneous light distribution upon illumination with the associated light source or light sources.

5. The motor vehicle as claimed in claim 1, wherein the first number of subarrays comprises one or more identical subarrays of a first type which produce the light pattern upon illumination with the associated light source or light sources, and the second number of subarrays comprises the first number of subarrays and of one or more identical subarrays of a second type, with the subarray or subarrays of the second type producing, upon illumination with the associated light source or light sources, a light pattern that is complementary to the light pattern which is produced by the one or more identical subarrays of the first type.

6. The motor vehicle as claimed in claim 1, wherein at least one of the light pattern and the homogeneous light distribution are overlaid by one or more symbols.

7. The motor vehicle as claimed in claim 1, wherein the light pattern and the homogeneous light distribution substantially cover the same surface area on the ground.

8. The motor vehicle as claimed in claim 1, wherein for generating different light patterns, a plurality of first numbers of subarrays are provided, which are controllable such that, when the environment illumination device is switched on, only a first number of subarrays can be activated by switching on the associated light source or light sources.

9. The motor vehicle as claimed in claim 1, wherein the projection module is arranged in a light shaft that extends into the body of the motor vehicle.

10. The motor vehicle as claimed in claim 1, wherein the installation position of the projection module in the motor vehicle can be adjusted.

11. The motor vehicle as claimed in claim 1, wherein the light pattern is a stripe pattern, wherein a density of stripes in the stripe pattern in a predetermined direction on the ground reduces with increasing distance of the stripe pattern from the installation position of the projection module in the motor vehicle.

12. The motor vehicle as claimed in claim 1, wherein at least one of the light pattern and the homogeneous light distribution expands along a predetermined direction on the ground with increasing distance of the respect at least one of the light pattern and the homogeneous light distribution from the installation position of the projection module in the motor vehicle.

13. The motor vehicle as claimed in claim 1, wherein a switching on of the environment illumination device corresponds to unlocking at least one of a central locking system and opening of an access door of the motor vehicle, and/or in that activation of the first and/or second number of subarrays is effected by way of dimming up the associated at least one light source.

14. The motor vehicle as claimed in claim 1, wherein an activation of at least one of the first and second number of subarrays is effected by way of dimming up an associated at least one light source.

15. The motor vehicle as claimed in claim 1, wherein a sensor is provided in the motor vehicle to detect at least one of rain and darkness, wherein only the homogeneous light distribution is generated by activating the second number of subarrays upon switching on of the environment illumination device in the case of at least one of rain and darkness being detected by the sensor.

16. The motor vehicle as claimed in claim 1, wherein the environment illumination device is configurable, via a user interface in the motor vehicle, as to whether the homogeneous light distribution or the light pattern should be produced when switching on the environment illumination device.

17. The motor vehicle as claimed in claim 1, wherein the projection module is mounted in a region of an access door of the motor vehicle such that at least one of the light pattern and the homogeneous light distribution are produced in an opening region of the access door, with the at least one of the light pattern and the homogeneous light distribution not being changed by opening the access door.

18. The motor vehicle as claimed in claim 1, wherein the projection module is provided in a door sill of the motor vehicle at an installation position that is located, in the longitudinal direction of the motor vehicle, in front of a person entry door.

19. The motor vehicle as claimed in claim 1, wherein the projection module is arranged in the motor vehicle such that at least one of the light pattern and the homogeneous light distribution extends on one side of the motor vehicle substantially along a driver or passenger entry door and an entry door for backseat passengers that is located behind it.

20. An environment illumination device for a motor vehicle for producing a light distribution on the ground in an area surrounding the motor vehicle, wherein the environment illumination device comprises:
  a projection module, which comprises a light-emitting means having a number of light sources and an array of projection optical units, wherein a respective projection optical unit comprises an object structure and an associated projection lens, such that, upon illumination of the array with the light-emitting means, the object structures are projected onto the ground by the associated projection lenses and the light distribution is thus generated,
 wherein the array of projection optical units comprises a plurality of subarrays, which are illuminable separately with at least one light source of the light-emitting means that is associated with the respective subarray,
 wherein the array has at least two different types of subarrays which, upon illumination with the at least one associated light source, generate different projections on the ground,
 wherein a first number of subarrays and a second number of subarrays are provided, which are controllable such that, when the environment illumination device is switched on, only the first number of subarrays can be activated by switching on the associated light source or light sources or only the second number of subarrays can be activated by switching on the associated light source or light sources, and
 wherein the first number of subarrays is configured such that, upon their activation, a light pattern is produced on the ground, and the second number of subarrays is configured such that, upon their activation, a homogeneous light distribution is produced on the ground.

* * * * *